United States Patent
Lee et al.

(10) Patent No.: US 12,119,477 B2
(45) Date of Patent: *Oct. 15, 2024

(54) METHOD FOR MANUFACTURING ELECTRODE COMPRISING POLYMERIC SOLID ELECTROLYTE AND ELECTRODE OBTAINED THEREBY

(71) Applicant: LG Chem, Ltd., Seoul (KR)

(72) Inventors: Jung-Pil Lee, Daejeon (KR); Ji-Hoon Ryu, Daejeon (KR); Sung-Joong Kang, Daejeon (KR); Jae-Hyun Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 981 days.

This patent is subject to a terminal disclaimer.

(21) Appl. No.: 16/979,635

(22) PCT Filed: May 3, 2019

(86) PCT No.: PCT/KR2019/005376
§ 371 (c)(1),
(2) Date: Sep. 10, 2020

(87) PCT Pub. No.: WO2019/212313
PCT Pub. Date: Nov. 7, 2019

(65) Prior Publication Data
US 2021/0043916 A1 Feb. 11, 2021

(30) Foreign Application Priority Data
May 3, 2018 (KR) .................. 10-2018-0051475

(51) Int. Cl.
*H01M 4/04* (2006.01)
*H01M 4/13* (2010.01)
(Continued)

(52) U.S. Cl.
CPC .......... *H01M 4/0416* (2013.01); *H01M 4/13* (2013.01); *H01M 4/139* (2013.01);
(Continued)

(58) Field of Classification Search
None
See application file for complete search history.

(56) References Cited

U.S. PATENT DOCUMENTS 5,814,420 A * 9/1998 Chu ..................... H01M 4/0411
429/102
6,312,971 B1 11/2001 Amundson et al.
(Continued)

FOREIGN PATENT DOCUMENTS

CN 107346819 A 11/2017
EP 3483953 A2 5/2019
(Continued)

OTHER PUBLICATIONS

Extended European Search Report including Written Opinion for Application No. 19796463.8 dated Apr. 22, 2021, 13 pages.
(Continued)

*Primary Examiner* — Maria Laios
*Assistant Examiner* — Angela J Martin
(74) *Attorney, Agent, or Firm* — Lerner David LLP

(57) ABSTRACT

The present disclosure relates to an electrode for an all solid-state battery and a method for manufacturing the same. The electrode comprises an electrode active material layer, wherein the gaps between the electrode active material particles forming the electrode active material layer are filled with a mixture of a polymeric solid electrolyte and a conductive material. The method for manufacturing the electrode comprises a solvent annealing process, and the contact between the electrode active material particles and the conductive material is improved through the solvent
(Continued)

annealing process, thereby improving ion conductivity of the electrode and capacity realization in the battery.

8 Claims, 2 Drawing Sheets

(51) Int. Cl.
    *H01M 4/139*     (2010.01)
    *H01M 10/05*     (2010.01)
    *H01M 10/0525*     (2010.01)
    *H01M 10/0565*     (2010.01)

(52) U.S. Cl.
    CPC ... *H01M 10/0525* (2013.01); *H01M 10/0565* (2013.01); *H01M 2300/0082* (2013.01)

(56) References Cited

U.S. PATENT DOCUMENTS

| | | | |
|---|---|---|---|
| 2002/0028379 A1 | 3/2002 | Okada et al. | |
| 2010/0009250 A1 | 1/2010 | Nakamura | |
| 2010/0279209 A1 | 11/2010 | Jeong et al. | |
| 2016/0294004 A1 | 10/2016 | Sasaki et al. | |
| 2017/0018768 A1* | 1/2017 | Yushin | H01M 4/362 |
| 2017/0098823 A1* | 4/2017 | Yushin | H01M 4/582 |
| 2017/0162862 A1 | 6/2017 | Thielen et al. | |
| 2017/0324076 A1 | 11/2017 | Lee et al. | |
| 2017/0338517 A1 | 11/2017 | Kwon et al. | |
| 2018/0191027 A1 | 7/2018 | Ohara et al. | |
| 2021/0020917 A1 | 1/2021 | Lee et al. | |
| 2021/0020945 A1 | 1/2021 | Lee et al. | |

FOREIGN PATENT DOCUMENTS

| | | |
|---|---|---|
| JP | H1167211 A | 3/1999 |
| JP | 2001110403 A | 4/2001 |
| JP | 3702318 B2 | 10/2005 |
| JP | 2006164783 A | 6/2006 |
| JP | 2011038089 A | 2/2011 |
| JP | 2013116934 A | 6/2013 |
| JP | 2016197590 A | 11/2016 |
| JP | 2017126611 A | 7/2017 |
| JP | 2021516858 A | 7/2021 |
| JP | 2021517717 A | 7/2021 |
| KR | 100839193 B1 | 6/2008 |
| KR | 20170050228 A | 5/2017 |
| KR | 20170081440 A | 7/2017 |
| KR | 20170130834 A | 11/2017 |
| KR | 20180014192 A | 2/2018 |
| KR | 20180027486 A | 3/2018 |
| WO | 2017006480 A1 | 1/2017 |

OTHER PUBLICATIONS

International Search Report for Application No. PCT/KR2019/005376 dated Aug. 22, 2019, 2 pages.

* cited by examiner

METHOD FOR MANUFACTURING ELECTRODE COMPRISING POLYMERIC SOLID ELECTROLYTE AND ELECTRODE OBTAINED THEREBY

CROSS-REFERENCE TO RELATED APPLICATIONS

This application is a national phase entry under 35 U.S.C. § 371 of International Application No. PCT/KR2019/005376 filed May 3, 2019, which claims priority from Korean Patent Application No. 10-2018-0051475 filed May 3, 2018, all of which are incorporated herein by reference.

TECHNICAL FIELD

The present disclosure relates to a method for manufacturing an electrode comprising a polymeric solid electrolyte and an electrode obtained thereby.

BACKGROUND ART

A lithium ion battery using a liquid electrolyte has a structure in which a negative electrode and positive electrode are defined by a separator, and thus may cause a short-circuit when the separator is damaged by deformation or external impact, resulting in a risk, such as overheating or explosion. Therefore, it can be said that development of a solid electrolyte capable of ensuring safety is a very important problem in the field of lithium ion secondary batteries.

A lithium secondary battery using a solid electrolyte has enhanced safety, prevents leakage of an electrolyte to improve the reliability of a battery, and facilitates manufacture of a thin battery. In addition, lithium metal may be used as a negative electrode to improve energy density. Thus, such a lithium secondary battery using a solid electrolyte has been expected to be applied to a high-capacity secondary battery for electric vehicles in addition to a compact secondary battery, and has been spotlighted as a next-generation battery.

However, a lithium secondary battery using a solid electrolyte has lower ion conductivity as compared to a battery using a liquid electrolyte and particularly shows degradation of output characteristics at low temperature. In addition, such a solid electrolyte is problematic in that it shows lower surface adhesion to an active material, as compared to a liquid electrolyte, to cause an increase in interfacial resistance, and is distributed while not being in contact with an electrode active material to cause degradation of output characteristics or capacity characteristics as compared to the amount of a conductive material introduced to an electrode.

FIG. 1 is a schematic view illustrating an electrode for an all solid-state battery comprising a polymeric solid electrolyte according to the related art. FIG. 1 shows an electrode 100 having an electrode active material layer 120 formed by coating slurry containing electrode active material particles 121, a conductive material 123 and a polymeric solid electrolyte 122 on a current collector 110, followed by compression. Since the interfacial contact between the electrode active material particles and the polymeric solid electrolyte is poor, a battery obtained by using such an electrode shows limited realization of capacity. If severe compression is carried out in order to increase the contact area between the active material particles and the polymeric solid electrolyte, the active material particles may be cracked. For these reasons, when using a polymeric solid electrolyte, it is not possible to realize capacity sufficiently as compared to an electrode using a liquid electrolyte. Thus, the capacity is lower than the designed or theoretical capacity.

DISCLOSURE

Technical Problem

The present disclosure is designed to solve the problems of the related art, and therefore the present disclosure is directed to providing an electrode which has improved energy density by increasing the contact area between electrode active material particles and a polymeric solid electrolyte to improve lithium ion transportability and ion conductivity and to enhance capacity realized by the electrode and output characteristics. The present disclosure is also directed to providing a method for manufacturing the above-mentioned electrode.

Technical Solution

The present disclosure relates to an electrode for an all solid-state battery and a method for manufacturing the same.

According to the first embodiment of the present disclosure, there is provided an electrode for an all solid-state battery which comprises an electrode active material layer comprising a plurality of electrode active material particles, a polymeric solid electrolyte and a conductive material, wherein the gaps between the electrode active material particles are filled with the polymeric solid electrolyte, the polymeric solid electrolyte comprises a swellable polymer electrolyte, the polymeric solid electrolyte is in a swelled state by solvent infiltration, and the electrode active material layer has a porosity of 0-18%.

According to the second embodiment of the present disclosure, there is provided the electrode for an all solid-state battery as defined in the first embodiment, wherein the polymeric solid electrolyte undergoes volumetric swelling by the infiltration of a vaporized organic solvent.

According to the third embodiment of the present disclosure, there is provided the electrode for an all solid-state battery as defined in the first or the second embodiment, which is obtained through a solvent annealing process, wherein the porosity of the electrode active material layer is reduced by the solvent annealing and the difference in porosity between before and after the solvent annealing process is 0.5% or more.

According to the fourth embodiment of the present disclosure, there is provided the electrode for an all solid-state battery as defined in any one of the first to the third embodiments, wherein the porosity is reduced by the swelling of the polymeric solid electrolyte after the solvent annealing process.

According to the fifth embodiment of the present disclosure, there is provided the electrode for an all solid-state battery as defined in any one of the first to the fourth embodiments, wherein the polymeric solid electrolyte is a solid polymer electrolyte formed by adding a polymer resin to a solvated lithium salt.

According to the sixth embodiment of the present disclosure, there is provided an all solid-state battery comprising the electrode as defined in any one of the first to the fifth embodiments. The all solid-state battery comprises a positive electrode, a negative electrode and a solid electrolyte layer interposed between the positive electrode and the negative electrode, wherein at least one of the positive electrode or the negative electrode is the electrode as defined in any one of the first to the fifth embodiments.

Meanwhile, there is also provided a method for manufacturing an electrode for an all solid-state battery. According to the seventh embodiment of the present disclosure, there is provided a method for manufacturing an electrode for an all solid-state battery, comprising the steps of: preparing slurry for forming an electrode active material layer containing electrode active material particles, a polymeric solid electrolyte and a conductive material; coating the slurry on at least one surface of a current collector to obtain a preliminary electrode; and subjecting the preliminary electrode to a solvent annealing process to obtain an electrode.

According to the eighth embodiment of the present disclosure, there is provided the method as defined in the seventh embodiment, wherein the polymeric solid electrolyte is a solid polymer electrolyte formed by adding a polymer resin to a solvated lithium salt.

According to the ninth embodiment of the present disclosure, there is provided the method as defined in the seventh or the eighth embodiment, wherein the solvent annealing process comprises the steps of: introducing the preliminary electrode to a sealed space; filling the sealed space with a vaporized solvent; and allowing the preliminary electrode to stand in the sealed space filled with the vaporized solvent.

According to the tenth embodiment of the present disclosure, there is provided the method as defined in any one of the seventh to the ninth embodiments, wherein the solvent annealing process is carried out for 1-72 hours.

According to the eleventh embodiment of the present disclosure, there is provided the method as defined in any one of the ninth and the tenth embodiments, wherein the solvent is at least one of an aprotic solvent selected from N,N-dimethylacetamide (DMAc), N-methyl pyrrolidone (NMP), dimethyl sulfoxide (DMSO) or N,N-dimethylformamide (DMF); or a protic solvent selected from water, methanol, ethanol, propanol, n-butanol, isopropyl alcohol, decalin, acetic acid or glycerol.

According to the twelfth embodiment of the present disclosure, there is provided the method as defined in any one of the seventh to the eleventh embodiments, wherein the polymeric solid electrolyte undergoes volumetric swelling by the infiltration of the vaporized organic solvent.

According to the thirteenth embodiment of the present disclosure, there is provided the method as defined in any one of the seventh to the twelfth embodiments, wherein the vaporized solvent has a temperature of 15-200° C.

Advantageous Effects

In the electrode according to the present disclosure, the contact area between the electrode active material particles and the polymeric solid electrolyte is increased to provide increased reaction sites of the electrode active material. In addition, since the conductive material is distributed in such a manner that it is positioned more closely to the periphery of the active material particles, the contact frequency between the conductive material and the electrode active material particles is increased. As a result, it is possible to increase lithium ion transportability during charge/discharge, thereby improving capacity realization of the electrode.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

BEST MODE

Figure 1:
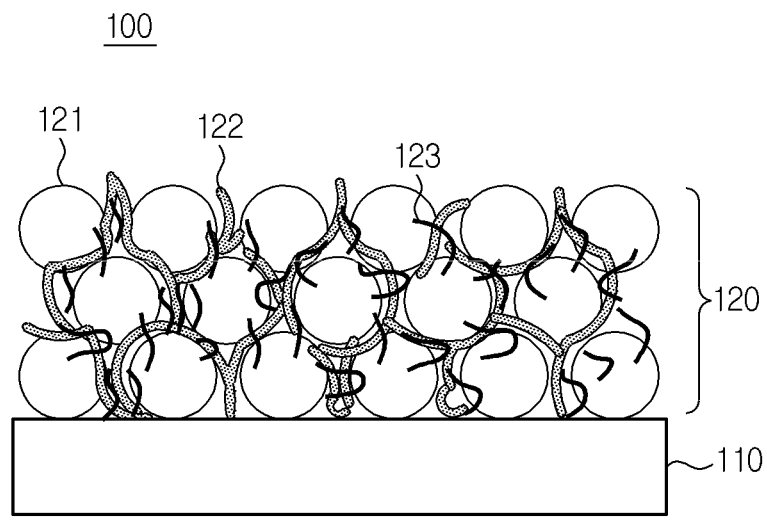
FIG. 1 is a schematic view illustrating an electrode comprising electrode active material particles, a polymeric solid electrolyte and a conductive material according to the related art.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part [comprises] an element' does not preclude the presence of any additional elements but means that the part may further include the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

The present disclosure relates to a method for manufacturing an electrode for a lithium ion secondary battery and an electrode obtained thereby. According to the present disclosure, the lithium ion secondary battery is an all solid-state battery using a polymeric solid electrolyte. According to the present disclosure, the all solid-state battery may also be referred to as a lithium polymer secondary battery or lithium ion polymer secondary battery.

According to an embodiment of the present disclosure, the electrode comprises an electrode active material layer comprising a plurality of electrode active material particles, a polymeric solid electrolyte and a conductive material, wherein the gaps between the electrode active material particles are filled with the polymeric solid electrolyte, and the polymeric solid electrolyte is in a swelled state by solvent infiltration so that lithium ion transportability may be increased. In addition, according to an embodiment of the present disclosure, the conductive material is positioned in the gaps between the electrode active material particles so that electrical conductivity may be increased. In other words, according to an embodiment of the present disclosure, the electrode active material particles in the electrode active material layer are integrated with one another through dot-to-dot and/or face-to-face binding mainly by means of the polymeric solid electrolyte. In addition, the conductive material is dispersed in the polymeric solid electrolyte. According to an embodiment of the present disclosure, the polymeric solid electrolyte may comprise a swellable polymer electrolyte. For example, the polymeric solid electrolyte may comprise a swellable polymer electrolyte in an amount of 50 vol % or more, 70 vol % or more, 80 vol % or more, 90 vol % or more, or 95 vol % or more. Otherwise, the polymeric solid electrolyte may totally comprise a swellable polymer electrolyte. As used herein, the swellable polymer electrolyte refers to one that comprises a polymer material and undergoes volumetric swelling by the infiltration of an organic solvent. Therefore, the polymeric solid electrolyte in the electrode according to the present disclosure may be in an expanded (swelled) state at a predetermined ratio by solvent infiltration. Therefore, the gaps between active material particles are filled with the swelled polymer (polymer electrolyte), and thus the porosity of the electrode active material layer is decreased and the contact area between the polymer electrolyte and the active material particles is increased in the electrode active material layer, thereby providing effects of improving the characteristics of a battery, comprising effects of reducing resistance and increasing capacity.

To accomplish such effects, it is preferred that the polymeric solid electrolyte according to the present disclosure can be swelled by solvent annealing. In addition, the polymeric solid electrolyte covers the surface of electrode active material particles and/or fills the gaps between the electrode active material particles, and may be one having a broad electric potential window. For example, in the case of a positive electrode, the polymeric solid electrolyte may be one having high oxidation stability. In addition, in the case of a negative electrode, the polymeric solid electrolyte may be one having high reduction stability. For example, in terms of oxidation stability, the polymeric solid electrolyte may comprise a polycarbonate-based polymer electrolyte, polysiloxane-based polymer electrolyte, phosphazene-based polymer electrolyte, or the like. In terms of reduction stability, the polymeric solid electrolyte may comprise a polyether-based polymer electrolyte.

According to an embodiment of the present disclosure, the polymeric solid electrolyte may be swelled at a ratio larger than 1% to 1,000% through the solvent annealing process. Within the above-defined range, the swelling ratio may be 50% or more, 100% or more, 200% or more, 300% or more, 400% or more, 500% or more, 600% or more, 700% or more, or 800% or more. When the polymeric solid electrolyte has a swelling degree lower than the above-defined range, it is not possible to improve the interfacial contact between the active material and the electrolyte sufficiently. When the polymeric solid electrolyte is swelled at a ratio excessively higher than the above-defined ratio, the electrode has an excessively large thickness to cause degradation of energy density. The swelling degree of the polymeric solid electrolyte may be affected by the molecular weight and/or crosslinking degree of the polymer material. The polymeric solid electrolyte is swelled more, when it has a smaller molecular weight and has a lower or no crosslinking degree.

In general, 'swelling' means a phenomenon in which a material absorbs a solvent and its volume is expanded. As used herein, 'swelling degree' is obtained by measuring the volume of a polymeric solid electrolyte before (the initial volume) and after solvent annealing and calculating a volumetric increment therefrom, and may be expressed by the following Formula 1). For example, when a polymeric solid electrolyte has a swelling degree of 100%, it can be said that the electrolyte volume is doubled as compared to the volume before solvent annealing. According to the present disclosure, the solvent annealing means that a polymeric solid electrolyte is exposed to a vaporized organic solvent for a predetermined time so that the vaporized organic solvent may infiltrate into the electrolyte. The exposure is carried out in a sealed space saturated with the steam of organic solvent, the exposure time may be controlled to 1-72 hours, and the temperature may be controlled to 15-200° C. According to an embodiment of the present disclosure, the temperature may be 30° C. or more, 50° C. or more, 80° C. or more, 100° C. or more, 120° C. or more, or 150° C. or more, and 140° C. or less, 130° C. or less, 120° C. or less, 100° C. or less, or 80° C. or less, within the above-defined range.

Swelling degree (%)={(Volume of polymeric solid electrolyte after solvent annealing−Initial volume of polymeric solid electrolyte)/Initial volume of polymeric solid electrolyte}×100    Formula 1)

For example, the polymeric solid electrolyte may be one having the above-defined range of swelling degree according to Formula 1), when it is exposed to saturated N-methyl pyrrolidone (NMP) steam atmosphere at a temperature of 30° C. for 24 hours. Otherwise, Formula 1) may also be used to set solvent annealing conditions (solvent, temperature and/or exposure time) capable of providing the above-defined range of swelling degree to a selected polymeric solid electrolyte.

As described hereinafter, the electrode for an all solid-state battery according to the present disclosure is obtained through a solvent annealing process after manufacturing a preliminary electrode. Herein, the polymeric solid electrolyte is swelled by the infiltration of vaporized solvent. Thus, the finished electrode has porosity lower than the porosity of the preliminary electrode. According to an embodiment of the present disclosure, the difference in porosity between the finished electrode for an all solid-state battery and the preliminary electrode may be 0.5% or more, 1% or more, 5% or more, or 10% or more. In addition, the finished electrode for an all solid-state battery has a larger height as compared to the preliminary electrode.

According to an embodiment of the present disclosure, the polymeric solid electrolyte mainly functions to transport lithium ions in the electrode and may be one having a desired ion conductivity, such as $10^{-7}$ S/cm or $10^{-4}$ S/cm or more.

According to an embodiment of the present disclosure, one or more polymeric solid electrolytes may be used suitably in order to supplement electrode characteristics and to realize characteristics of electrode active material particles.

According to an embodiment of the present disclosure, the ion conductivity may be determined by measuring the electrochemical impedance of an electrolyte material by using a tester, such as VMP3 (Bio logic science instrument) and applying the nyquist plot assessment to the measured result. According to the present disclosure, the polymeric solid electrolyte may be a polymer solid electrolyte formed by adding a polymer resin to a solvated lithium salt.

For example, the polymer solid electrolyte may comprise any one selected from the group consisting of a polyether polymer, polycarbonate polymer, acrylate polymer, polysiloxane polymer, phosphazene polymer, polyethylene derivatives, alkylene oxide derivatives, phosphate polymer, polyagitation lysine, polyester sulfide, polyvinyl alcohol, polyvinylidene fluoride and polymer containing an ionically dissociable group, or a mixture of two or more of them. However, the scope of the present disclosure is not limited thereto.

According to an embodiment of the present disclosure, the polymer solid electrolyte may comprise a polymer resin selected from the group consisting of a polymer resin, such as a branched copolymer comprising polyethylene oxide (PEO) backbone copolymerized with a comonomer comprising an amorphous polymer, such as PMMA, polycarbonate, polydiloxane (pdms) and/or phosphazene, comb-like polymer and crosslinked polymer resin, or a mixture of two or more of them.

In the electrolyte according to the present disclosure, the lithium salt is an ionizable lithium salt and may be represented by $Li^+ X^-$. The anion ($X^-$) of the lithium salt is not particularly limited, but may comprise $F^-$, $Cl^-$, $BR^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, or the like.

According to an embodiment of the present disclosure, the electrode active material layer may comprise 1-100 parts by weight of the polymeric solid electrolyte based on 100 parts by weight of the electrode active material. Within the above-defined range, the polymeric solid electrolyte may be used in an amount of 2 parts by weight or more, 10 parts by weight or more, 20 parts by weight or more, 30 parts by weight or more, 50 parts by weight or more, or 70 parts by weight or more, and 95 parts by weight or less, 90 parts by weight or less, 80 parts by weight or less, 70 parts by weight or less, 60 parts by weight or less, 50 parts by weight or less, 40 parts by weight or less, or 30 parts by weight or less. When the polymeric solid electrolyte is used in an amount larger than the upper limit, the proportion of the active material in the electrode is low to cause degradation of energy density. On the other hand, when the polymeric solid electrolyte is used in an amount smaller than the lower limit, the ion conductivity in the electrode is reduced to cause a decrease in capacity realization.

According to the present disclosure, the conductive material is not particularly limited, as long as it causes no chemical change in the corresponding battery and has conductivity. For example, the conductive material comprise any one selected from: graphite, such as natural graphite or artificial graphite; carbon black, such as carbon black, acetylene black, Ketjen black, channel black, furnace black, lamp black or thermal black; conductive fibers, such as carbon fibers (e.g. vapor grown carbon fibers (VGCF)) or metallic fibers; metal powder, such as carbon fluoride, aluminum or nickel powder; conductive whisker, such as zinc oxide or potassium titanate; conductive metal oxide, such as titanium oxide; and conductive materials, such as polyphenylene derivatives, or a mixture of two or more of them.

According to an embodiment of the present disclosure, the electrode active material layer may comprise the conductive material in an amount of 0-30 wt % based on 100 wt % of the electrode active material layer. According to an embodiment, the conductive material may be used in an amount of 0.5 wt % or more, 1 wt % or more, 3 wt % or more, or 5 wt % or more, and 15 wt % or less, 10 wt % or less, 7 wt % or less, or 5 wt % or less, within the above-defined range. For example, the conductive material may be used in an amount of 0.5-5 wt % based on 100 wt % of the electrode active material layer. When the amount of conductive material is larger than the upper limit, the proportion of active material is reduced to cause a decrease in energy density. When the amount of conductive material is smaller than the lower limit, it is not possible to realize a desired level of electron conductivity, resulting in degradation of capacity realization.

According to an embodiment of the present disclosure, the electrode may be any one of a negative electrode and a positive electrode. When the electrode is a negative electrode, the negative electrode active material may be any material used conventionally as a negative electrode active material for a lithium ion secondary battery. For example, the negative electrode active material may comprise at least one selected from: carbon such as non-graphitizable carbon, graphitic carbon, or the like; metal composite oxides such as $Li_xFe_2O_3$ ($0 \leq x\ 1$), $Li_xWO_2$ ($0 \leq x \leq 1$), $Sn_xMe_{1-x}Me'_yO_z$ (Me: Mn, Fe, Pb or Ge; Me': Al, B, P, Si, an element of Group 1, Group 2 or Group 3 in the Periodic Table, or halogen; $0<x\leq1$; $1\leq y\leq3$; $1\leq z\leq8$); lithium metal; lithium alloys; silicon-based alloys; tin-based alloys; metal oxides such as SnO, $SnO_2$, PbO, $PbO_3$, $Pb_3O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, or the like; conductive polymers such as polyacetylene; Li—Co—Ni based materials; titanium oxide; and lithium titanium oxide, or the like. According to an embodiment of the present disclosure, the negative electrode active material may comprise a carbonaceous material and/or Si.

When the electrode is a positive electrode, the positive electrode active material may be any material used conventionally as a positive electrode active material for a lithium ion secondary battery. Non-limiting examples of the positive electrode active material may comprise, but are not limited to: layered compounds such as lithium cobalt oxide ($LiCoO_2$) and lithium nickel oxide ($LiNiO_2$), or those compounds substituted with one or more transition metals ($Li_{1+a}[Ni_xMn_yCo_{(1-x-y)}]M_zO_2$, wherein $0 \leq a \leq 0.2$, $0.4 \leq x \leq 0.9$, $0 < x+y < 1$, M is at least one element selected from the group consisting of Co, Mn, Ni, Al, Fe, V, Cr, Ti, Ta, Mg, Mo, Zr, W, Sn, Hf, Nd and Gd, and $0 \leq z \leq 0.1$); lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.0100.3); lithium manganese composite oxides represented by the chemical formula of $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); lithium manganese composite oxides having a spinel structure and represented by the formula of $LiNi_xMn_{2-x}O_4$; $LiMn_2O_4$ in which Li is partially substituted with an alkaline earth metal ion; disulfide compounds; $Fe_2(MoO_4)_3$; or the like.

According to an embodiment of the present disclosure, the positive electrode active material and/or negative electrode active material may have a particle diameter of about 0.01-50 μm, and may have a shape of secondary particles formed by aggregation of a plurality of particles.

The electrode active material layer may be formed on at least one surface of a current collector. In addition, the electrode may further comprise a binder resin, if necessary.

According to the present disclosure, the binder resin is not particularly limited, as long as it is an ingredient which assists binding between the electrode active material and the conductive material and binding to the current collector. Particular examples of the binder resin comprise polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butyrene rubber, fluororubber, various copolymers, or the like. In general, the binder resin is added in an amount of 1-30 wt %, or 1-10 wt %, based on 100 wt % of electrode active material layer.

According to an embodiment of the present disclosure, the electrode may further comprise various additives in order to supplement or improve the physicochemical properties thereof. Although there is no particular limitation, the additives may comprise at least one of a flame retardant, heat stabilizer, anti-fogging agent, or the like.

According to the present disclosure, the current collector comprises a metal plate having electrical conductivity and may be one selected suitably depending on polarity of electrodes known in the field of secondary batteries. In addition, the current collector may have a thickness controlled adequately within a range of 1-50 μm.

According to an embodiment of the present disclosure, the finished electrode (electrode active material layer) may have a porosity selected adequately within a range of 0-18%. According to an embodiment of the present disclosure, the porosity may be 1% or more, 3% or more, 5% or more, 7% or more, 10% or more, or 15% or more, or 17% or more, and 18% or less, 15% or less, 10% or less, 7% or less, or 5% or less. For example, the porosity may be 1-15% or 5-18%.

Since an all solid-state battery uses an electrolyte in a solid phase rather than a liquid phase, the contact area between the electrode active material and the solid electrolyte material is increased and the electrode active material is in closer contact with the solid electrolyte material, as the porosity is decreased, thereby realizing a desired level of ion conductivity. According to an embodiment of the present disclosure, the electrode for an all solid-state battery preferably has low porosity sufficient to realize a desired level of ion conductivity.

The term 'porosity' means a ratio of volume occupied by pores based on the total volume of a given structure, is expressed in the unit of %, and may be used interchangeably with the term of pore ratio or porous degree. According to the present disclosure, the porosity may be determined by any method with no particular limitation. For example, the porosity may be determined by using the Brunauer-Emmett-Teller (BET) method or Hg intrusion porosimetry. According to an embodiment of the present disclosure, the apparent density of a finished electrode (electrode active material layer) is calculated from the volume and weight of a finished electrode (electrode active material layer) and the net density of an electrode active material layer is calculated from the compositional ratio of ingredients contained in the electrode (electrode active material layer) and density of each ingredient. Then, the porosity of an electrode active material layer may be calculated from the difference between the apparent density and the net density.

Hereinafter, the method for manufacturing the above-described electrode will be explained. The following method is one of the embodiments that may be applied to manufacture the electrode according to the present disclosure and the scope of the present disclosure is not limited thereto.

First, slurry for forming an electrode active material layer containing electrode active material particles, a polymeric solid electrolyte and a conductive material is prepared (S1).

Particularly, a mixture containing a polymeric solid electrolyte and a conductive material is prepared. The polymeric solid electrolyte may be provided in the form of a melt blend obtained by melting a polymer resin and lithium salt at high temperature or in the form of a solution containing a polymer resin and lithium salt dispersed homogeneously in an organic solvent. Then, the conductive material is added to the blend or solution, followed by mixing, to provide a mixture. The mixture may further comprise a binder resin, if necessary. In addition, electrode active material particles are added thereto and mixed to prepare slurry for forming an electrode active material layer. The content of each of the electrode active material and polymeric solid electrolyte in the slurry may be the same as described above.

However, the above-mentioned method for preparing slurry is an exemplary embodiment and the scope of the present disclosure is not limited thereto. Particularly, the order of introduction or mixing of slurry ingredients may be modified considering the physicochemical properties of ingredients and the characteristics of an electrode or battery to be obtained. For example, the polymeric solid electrolyte, conductive material and the electrode active material may be introduced to a dispersion medium, such as a solvent, at different times or at the same time.

Next, the slurry is coated on at least one of a current collector to obtain a preliminary electrode (S2). As used herein, 'preliminary electrode' means an electrode not subjected to solvent annealing.

The coating may be carried out by applying the slurry onto at least one surface of a current collector, followed by drying, and performing compression, if necessary. The slurry may be applied by using a conventional slurry coating process, such as doctor blade coating or slot die coating. Then, the applied slurry is dried and subjected to a compression process, if necessary. The compression process allows packing of ingredients so that the electrode active material layer may have an adequate level of porosity and is not limited to a particular method. For example, any known compression method, such as hot pressing or rolling, may be used suitably, and may be optionally controlled to a suitable temperature condition through heating or cooling.

After that, the resultant preliminary electrode is subjected to a solvent annealing process (S3). During the solvent annealing, the polymeric solid electrolyte is exposed to a vaporized organic solvent and the vaporized organic solvent infiltrates into the solid electrolyte to cause volumetric swelling of the electrolyte. The solvent annealing process may comprise the steps of: introducing the preliminary electrode to a sealed space (e.g. chamber); filling the sealed space with a vaporized solvent; and allowing the preliminary electrode to stand in the sealed space filled with the vaporized solvent.

In the step of allowing the preliminary electrode to stand in the sealed space, the vaporized solvent infiltrates into the polymeric solid electrolyte, and thus the polymeric solid electrolyte is swelled. According to an embodiment of the present disclosure, the sealed space may be filled with the vaporized solvent by vaporizing the solvent in a separate space linked to the chamber through a pipe and injecting the vaporized solvent to the chamber. In a variant, a liquid solvent is received in a separately prepared container, the container is introduced to a chamber, and the chamber is heated so that the solvent may be vaporized directly in the chamber. Herein, it is preferred that the liquid solvent is spaced apart from the electrode by a predetermined interval so that they may not be in direct contact with each other.

Meanwhile, it is possible to change the order of the step of introducing the preliminary electrode to a sealed space (e.g. chamber) and the step of filling the sealed space with the vaporized solvent, if necessary. For example, the chamber may be filled with the vaporized solvent before the preliminary electrode is introduced to the chamber. According to an embodiment of the present disclosure, the vaporization step may be carried out at a temperature ranging from about 15-200° C., considering the vapor pressure or boiling point of the solvent. For example, the vaporization step may be carried out at room temperature of about 20-30° C. or may be carried out at a higher temperature, such as about 200° C. or lower, through heating. In other words, according to an embodiment of the present disclosure, the vaporized solvent may have a temperature of about 15-200° C., and solvent annealing may be carried out in the chamber filled with the vaporized solvent at the above-defined range of temperature for a predetermined time. Unless otherwise stated herein, temperature is described in a Celsius temperature scale.

According to an embodiment of the present disclosure, the sealed space, such as a chamber, in which solvent annealing is carried out should be saturated with the vaporized solvent. To accomplish this, the sealed space is maintained at least under the vapor pressure of the solvent. According to an embodiment of the present disclosure, the vaporized solvent may be introduced continuously until the solvent annealing is terminated. Otherwise, when the liquid solvent is also introduced to the chamber and heated, an excessive amount of solvent is introduced so that the solvent may not be totally vaporized but a residual amount of solvent may remain until the solvent annealing process is terminated. The amount of solvent may be determined considering the amount (volume or weight) of the polymeric solid electrolyte used for the electrode and/or chamber size. For example, when using N-methyl pyrrolidone (NMP) is used as a solvent, the chamber may have a size of about 300 mL, and solvent annealing is carried out at 130° C. for 24 hours, about 300 µL of NMP may be introduced.

According to an embodiment of the present disclosure, the solvent used for solvent annealing is not particularly limited, as long as it is chemically stable and particularly it causes no deterioration of an electrode when being applied to the electrode. For example, it is possible to use a solvent selected from solvents that may be used as electrolytes for electrochemical devices. For example, the solvent may comprise at least one selected from cyclic, linear or branched carbonates, linear esters, ethers, or the like. Non-limiting examples of such solvents may comprise propylene carbonate (PC), ethylene carbonate (EC), butylene carbonate (BC), diethyl carbonate (DEC), dimethyl carbonate (DMC), dipropyl carbonate(DPC), methyl propionate (MP), dimethyl sulfoxide, dimethoxyethane, diethoxyethane, tetrahydrofuran, N-methyl-2-pyrrolidone (NMP), ethyl methyl carbonate (EMC), vinylene carbonate (VC), gamma-butyrolactone (GBL), fluoroethylene carbonate (FEC), methyl formate, ethyl formate, propyl formate, methyl acetate, ethyl acetate, propyl acetate, pentyl acetate, methyl propionate, ethyl propionate, propyl propionate, butyl propionate, or the like.

In addition, the solvent may comprise at least one of an aprotic solvent selected from N,N-dimethyl acetamide (DMAc), N-methyl pyrrolidone (NMP), dimethyl sulfoxide (DMSO), N,N-dimethylformamide (DMF), tetrahydrofuran (THF), acetonitrile, benzene, butyl acetate, chloroform, cyclohexane, 1,2-dichloroethane, ethyl acetate, diethyl ether, hexane, heptane, pentane, xylene or toluene; or a protic solvent selected from water, methanol, ethanol, propanol, n-butanol, isopropyl alcohol, decalin, acetic acid or glycerol.

In addition, solvent annealing may be carried out for 1-72 hours and the solvent annealing time may be controlled adequately. For example, the solvent annealing time may be 2 hours or more, 10 hours or more, 20 hours or more, 30 hours or more, or 50 hours or more, or 65 hours or less, 60 hours or less, 50 hours or less, 40 hours or less, or 30 hours or less, within the above-defined range. When the annealing time is within the above-defined ranges, solvent annealing may be carried out efficiently through solvent evaporation. In addition, when the annealing time is longer than the above-defined range, productivity is decreased due to an increase in electrode processing time. When the annealing time is shorter than the above-defined range, the polymeric solid electrolyte forming the electrolyte may not be swelled homogeneously.

Meanwhile, according to an embodiment of the present disclosure, a compression step may be further carried out in order to control the porosity, after completing the solvent annealing.

In the electrode obtained from the above-described method, the polymeric solid electrolyte is swelled by solvent infiltration and is packed in the electrode active material layer. Thus, the active material particles are closely bound with the polymeric solid electrolyte and the conductive material through face-to-face and dot-to-dot binding, thereby providing an integrated electrode structure.

The electrode obtained from the above-described method may be supplied to a process for manufacturing an electrode assembly for an all solid-state battery and/or an all solid-state battery. Herein, it is preferred that the solid electrolyte is introduced to the subsequent process, while maintaining its swelled state after the annealing.

FIG. 1 is a schematic view illustrating the electrode obtained by the conventional method for manufacturing an electrode. According to the conventional method, the electrode 100 is obtained by mixing electrode active material particles 121, a polymeric solid electrolyte 122 and a conductive material 123 all at once to prepare electrode slurry, and coating the slurry onto a current collector. In this case, the electrode active material is not in close contact with the solid electrolyte and the contact area is small, and thus it is not possible to ensure sufficient electrochemical reaction sites between the electrode active material and the solid electrolyte. As a result, there are problems in that battery performance cannot be realized sufficiently due to a decrease in capacity, degradation of output characteristics, a decrease in ion conductivity, an increase in interfacial resistance, or the like. To solve the above-mentioned problems, there is a need for a compression step in which the electrode surface is compressed under a high pressure condition after coating the electrode in order to increase the contact area between the electrode active material and polymeric solid electrolyte. However, in this case, there are problems in that the active material is cracked due to the high pressure applied during the compression step, resulting in degradation of battery capacity and life characteristics.

Figure 2:
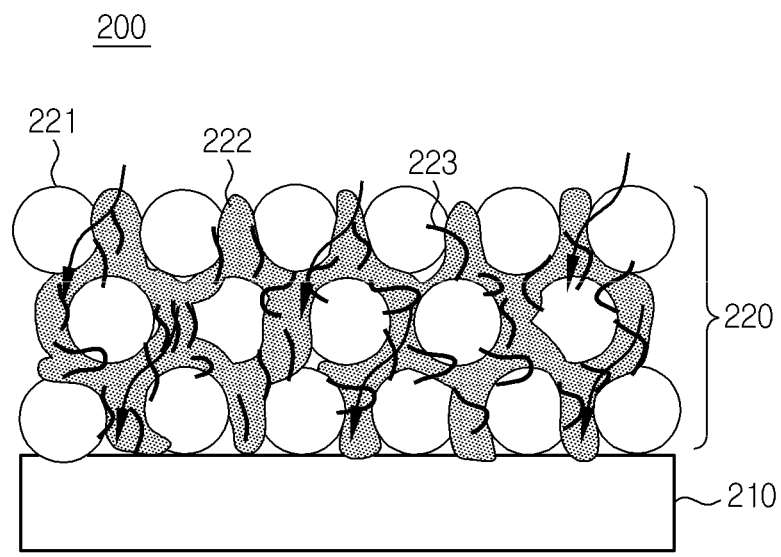
FIG. 2 is a schematic view illustrating infiltration of solvent steam to the electrode comprising electrode active material particles, a polymeric solid electrolyte and a conductive material according to an embodiment of the present disclosure.
Figure 3:
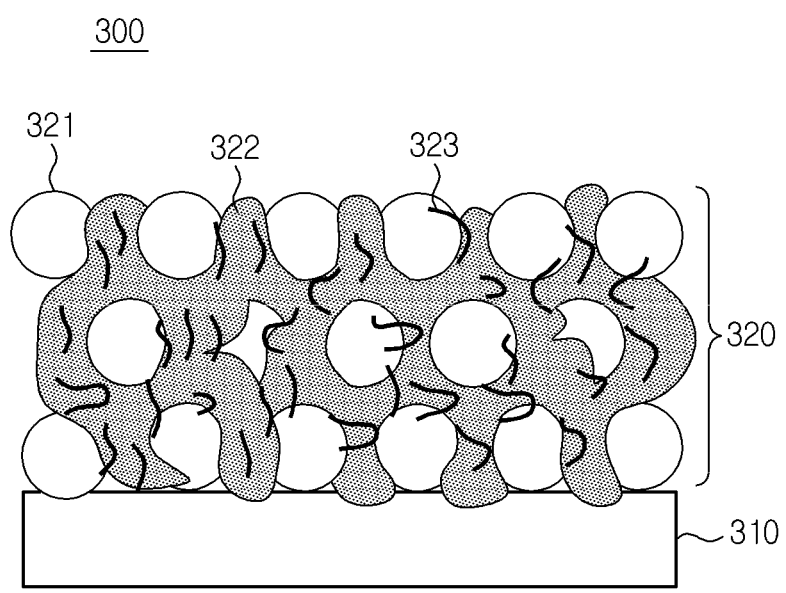
FIG. 3 is a schematic view illustrating an electrode comprising electrode active material particles, a polymeric solid electrolyte and a conductive material according to an embodiment of the present disclosure.

FIGS. 2 and 3 are schematic views illustrating the electrode 200, 300 according to an embodiment of the present disclosure. Referring to FIGS. 2 and 3, the electrode active material layer 220, 320 is formed on one surface of the current collector 210, 310, and the polymeric solid electrolyte 222, 322 in the electrode active material layer 220, 320 is swelled homogeneously as a whole by the solvent steam (shown by the arrow mark in FIG. 2) infiltrating during the solvent annealing process so that the electrode active material particles 221, 321 and the solid electrolyte 222, 322 may be in close contact with each other and the area of electrochemical reaction sites may be increased. In addition, the conductive material 223, 323 is positioned near the surface of the electrode active material particles 221, 321, and thus participates in electrochemical reactions at a higher ratio. As a result, use of conductive material can be reduced. In addition, the solid electrolyte and the electrode active material are in good contact with each other even when no severe pressure is applied during the compression of the electrode. Thus, it is possible to ensure sufficient reaction sites and to prevent deterioration of the electrode caused by compression. Further, it is possible to increase lithium ion transportability and capacity realization of the active material.

In another aspect of the present disclosure, there is provided a lithium ion secondary battery comprising one or more of the above-described electrode. The battery comprises a positive electrode, a negative electrode and a solid electrolyte membrane interposed between the positive electrode and the negative electrode, wherein at least one of the negative electrode or the positive electrode is the above-described electrode according to the present disclosure.

According to the present disclosure, the solid electrolyte membrane is interposed between the negative electrode and the positive electrode, and functions to allow lithium ion to pass therethrough while electrically insulating the negative electrode and the positive electrode from each other. The solid electrolyte membrane may be any solid electrolyte membrane used conventionally in the field of all solid-state batteries with no particular limitation. According to an embodiment of the present disclosure, the solid electrolyte membrane is prepared in the shape of a film or membrane, and may be a free-standing type membrane interposed between the electrodes or may be coated on the electrodes in the form of a membrane or film.

According to an embodiment of the present disclosure, the solid electrolyte membrane may comprise at least one of the solid electrolyte ingredients used for the electrode according to the present disclosure. In addition, the solid electrolyte membrane may comprise an inorganic solid electrolyte ingredient independently from or in combination with the above-described polymeric solid electrolyte ingredients. The inorganic solid electrolyte may be at least one selected from sulfide-based solid electrolytes or oxide-based solid electrolytes, and any inorganic solid electrolyte may be used with no particular limitation, as long as it is used generally as a solid electrolyte for an all solid-state battery.

In still another aspect of the present disclosure, there are provided a battery module comprising the secondary battery as a unit cell, a battery pack comprising the battery module, and a device comprising the battery pack as a power source.

Herein, particular examples of the device may comprise, but are not limited to: power tools driven by an electric motor; electric cars, comprising electric vehicles (EV), hybrid electric vehicles (HEV), plug-in hybrid electric vehicles (PHEV), or the like; electric carts, comprising electric bikes (E-bikes) and electric scooters (E-scooters); electric golf carts; electric power storage systems; or the like.

Examples will be described more fully hereinafter so that the present disclosure can be understood with ease. However, the following examples are for illustrative purposes only and the scope of the present disclosure is not limited thereto.

EXAMPLES

Manufacture of Electrode and Battery

Example 1

(1) Manufacture of Electrode

First, NCM811 ($LiNi_{0.8}Co_{0.1}Mn_{0.1}O_2$) as an electrode active material, vapor grown carbon fibers (VGCF) as a conductive material and a polymeric solid electrolyte (a mixture of polyethylene oxide (PEO) with LiFSI (($LiCF_3SO_2)_2N$), molar ratio of PEO:LiFSI, [EO]:[$Li^+$]=20:1) were mixed at a weight ratio of 80:3:17 and the resultant mixture was introduced to acetonitrile, followed by agitation, to provide electrode slurry. An aluminum current collector having a thickness of 20 μm was prepared. The slurry was applied to the current collector by using a doctor blade and the resultant product was vacuum-dried at 120° C. for 4 hours. Then, compression was carried out by using a roll press device to obtain a preliminary electrode having a loading amount of 2 $mAh/cm^2$, an electrode active material layer thickness of 48 μm and a porosity of 22%.

Then, the electrode was introduced to a chamber (300 mL) and 300 μL of N-methyl pyrrolidone (NMP) was introduced to the chamber together with the electrode in such a manner that the solvent might not be in direct contact with the electrode. The chamber was sealed and was maintained at 60° C. for 24 hours to carry out solvent annealing. In this manner, an electrode comprising an electrode active material layer having a porosity of 10% was obtained. The porosity means the ratio of volume of pores (pore volume) occupied by pores based on the total volume. The porosity was calculated by using the apparent density calculated from the volume and weight of each electrode active material layer and the net density calculated from the compositional ratio of the ingredients and density of each ingredient, as well as the pore volume obtained therefrom.

(2) Manufacture of Battery

The electrode obtained from (1) was cut into a circular shape with an area of 1.4875 $cm^2$. Lithium metal foil cut into a circular shape with an area of 1.7671 $cm^2$ was prepared as a counter electrode. Then, a solid electrolyte membrane (a mixture of PEO with LiFSI (($LiCF_3SO_2)_2N$), molar ratio of PEO:LiFSI, [EO]:[$Li^+$]=20:1) having a thickness of 50 μm was interposed between both electrodes to obtain a coin type half-cell.

Example 2

An electrode and a battery were manufactured in the same manner as Example 1, except that solvent annealing was carried out at room temperature. Before solvent annealing, the electrode active material layer had a porosity of 22%. After solvent annealing, the electrode active material layer had a porosity of 16%.

Example 3

An electrode and a battery were obtained in the same manner as Example 1, except that solvent annealing was carried out at 100° C. for 6 hours. Before solvent annealing, the electrode active material layer had a porosity of 22%. After solvent annealing, the electrode active material layer had a porosity of 12%.

Comparative Example 1

An electrode and a battery were obtained in the same manner as Example 1, except that solvent annealing was not carried out. The electrode active material layer had a porosity of 22%.

Test Example 1

Evaluation of Initial Discharge Capacity and Output Characteristics

Each of the batteries according to Examples 1-3 and Comparative Example 1 was charged/discharged to evaluate the initial discharge capacity and capacity retention. Meanwhile, when evaluating output characteristics, the first charge/discharge were carried out at 60° C. and 0.05 C, the 30$^{th}$ cycle was terminated in a discharged state, and capacity retention was evaluated.

Charge condition: CC (constant current)/CV (constant voltage), (4.0V or 4.25V, 0.005 C current cut-off)

Discharge condition: CC (constant current), 3V

The capacity retention was derived by calculating the ratio of discharge capacity after 30 cycles based on discharge capacity at the first cycle. The results are shown in the following Table 1.

TABLE 1

| | Discharge capacity (mAh/g, 4.0 V) | Output characteristics (%) 0.2 C/0.05 C, 4.0 V |
|---|---|---|
| Example 1 | 136 | 70 |
| Example 2 | 131 | 67 |
| Example 3 | 135 | 68 |
| Comp. Ex. 1 | 126 | 61 |

As can be seen from the above results, in the case of Examples 1-3, the polymer electrolyte in the electrode active material layer is swelled by the solvent annealing process to cause an increase in contact area between the electrode active material layer and the solid electrolyte, thereby accelerating intercalation/deintercalation of ions to/from the active material. As a result, the capacity and output characteristics are improved as compared to Comparative Example 1.

What is claimed is:

1. A method for manufacturing an electrode for an all solid-state battery, comprising the steps of:
   preparing a slurry for forming an electrode active material layer containing electrode active material particles, a polymeric solid electrolyte and a conductive material;
   coating the slurry on at least one surface of a current collector to obtain a preliminary electrode; and
   subjecting the preliminary electrode to a solvent annealing process, in which the polymeric solid electrolyte is exposed to a vaporized organic solvent and the vaporized organic solvent infiltrates into the solid electrolyte to cause volumetric swelling of the electrolyte, to obtain an electrode.

2. The method for manufacturing an electrode for an all solid-state battery according to claim 1, wherein the polymeric solid electrolyte is a solid polymer electrolyte formed by adding a polymer resin to a solvated lithium salt.

3. The method for manufacturing an electrode for an all solid-state battery according to claim 1, wherein the solvent annealing process comprises the steps of:
   introducing the preliminary electrode to a sealed space;
   filling the sealed space with the vaporized organic solvent; and
   allowing the preliminary electrode to stand in the sealed space filled with the vaporized organic solvent.

4. The method for manufacturing an electrode for an all solid-state battery according to claim 1, wherein the solvent annealing process is carried out for 1-72 hours.

5. The method for manufacturing an electrode for an all solid-state battery according to claim 3, wherein the solvent comprises at least one of an aprotic solvent selected from N,N-dimethylacetamide (DMAc), N-methyl pyrrolidone (NMP), dimethyl sulfoxide (DMSO) or N,N-dimethylformamide (DMF); or a protic solvent selected from water, methanol, ethanol, propanol, n-butanol, isopropyl alcohol, decalin, acetic acid or glycerol.

6. The method for manufacturing an electrode for an all solid-state battery according to claim 1, wherein the solvent annealing process is carried out at a temperature of 15-200° C.

7. The method for manufacturing an electrode for an all solid-state battery according to claim 1, wherein the polymeric solid electrolyte is swelled at a swelling degree of larger than 1% to 1,000% after the solvent annealing process.

8. The method for manufacturing an electrode for an all solid-state battery according to claim 1, further comprising compressing the electrode after the solvent annealing process.

* * * * *